United States Patent
Matias et al.

(10) Patent No.: US 8,364,697 B2
(45) Date of Patent: Jan. 29, 2013

(54) METHOD AND SYSTEM FOR CREATION AND DYNAMIC UPDATING OF BEST DATA ARRANGEMENT IN DIGITAL DATA STORE SYSTEM

(75) Inventors: Yossi Matias, Tel Aviv (IL); Guy Shaked, Beer Sheva (IL); Vladimir Braverman, Los Angeles, CA (US); Victor Belyaev, Beer Sheva (IL); Shahar Golan, Beer Sheva (IL); Marina Sadetsky, Kfar Saba (IL)

(73) Assignee: Yanicklo Technology Limited Liability Company, Wilmington, DE (US)

( * ) Notice: Subject to any disclaimer, the term of this patent is extended or adjusted under 35 U.S.C. 154(b) by 353 days.

(21) Appl. No.: 12/490,981

(22) Filed: Jun. 24, 2009

(65) Prior Publication Data

US 2009/0327217 A1 Dec. 31, 2009

(30) Foreign Application Priority Data

Jun. 26, 2008 (IL) .......................................... 192477

(51) Int. Cl.
*G06F 17/30* (2006.01)
(52) U.S. Cl. ...................................................... 707/769
(58) Field of Classification Search .................. 707/769, 707/758, 705, 813, 779, 999.1, 999.102, 707/999.003, 999.001
See application file for complete search history.

(56) References Cited

U.S. PATENT DOCUMENTS

| | | | |
|---|---|---|---|
| 5,675,785 A | 10/1997 | Hall et al. | |
| 5,926,810 A | 7/1999 | Noble et al. | |
| 6,009,271 A * | 12/1999 | Whatley | 717/127 |
| 6,438,537 B1 | 8/2002 | Netz et al. | |
| 6,640,244 B1 | 10/2003 | Bowman-Amuah | |
| 7,219,109 B1 | 5/2007 | Lapuyade et al. | |
| 7,415,617 B2 | 8/2008 | Ginter et al. | |
| 7,945,572 B2 | 5/2011 | Lapin et al. | |
| 7,974,984 B2 | 7/2011 | Reuther | |
| 8,121,975 B2 * | 2/2012 | Averbuch et al. | 707/600 |
| 8,140,545 B2 | 3/2012 | Iselborn et al. | |
| 2002/0107835 A1 * | 8/2002 | Coram et al. | 707/1 |
| 2002/0169777 A1 | 11/2002 | Balajel et al. | |
| 2004/0139116 A1 | 7/2004 | Porter | |
| 2008/0133454 A1 | 6/2008 | Markl et al. | |
| 2010/0235365 A1 | 9/2010 | Newby, Jr. | |

OTHER PUBLICATIONS

International Search Report mailed Apr. 12, 2010; International Appln. No. PCT/IL09/01187, filed Dec. 14, 2009.

* cited by examiner

*Primary Examiner* — Amresh Singh
(74) *Attorney, Agent, or Firm* — Knobbe, Martens, Olson & Bear LLP

(57) ABSTRACT

The current invention is a method and a system for analyzing templates of queries, with different levels of precision. When the system of the current invention takes a decision to arrange data, these templates are used, and a single data arrangement object (HRBlob) is designed which may serve a single template or several templates and not just a single query. This approach has an important impact on data arrangement performance and on queries performance, since this approach may help many more queries to be handled using less data arrangement objects.

24 Claims, 9 Drawing Sheets

Query 1: Select col1, col2, measure1, measure2 from table where col1 <predicate.> <values list> <and/or> col2 <predicate> <value list>;

Query 2: Select col2, col3, measure2, measure3 from table where col1 <predicate.> <values list> <and/or> col3 <predicate> <values list>;

 Queries templates

Query 1 template:
Sources: table
Returned columns: col1, col2, measure1, measure2
Columns' Filters: col1 <predicate strength> col2 <predicate strength >;

Query 2 template:
Sources: table
Returned columns: col2, col3, measure2, measure3
Columns' Filters: col1 <predicate strength> col3 <predicate strength >;

 Queries common template

Unified query template:
Sources: table
Returned columns: col1, col2, col3, measure2, measure3
Columns' Filters: col1 <predicate strength> col2 <predicate strength > col3 <predicate strength >;

 Potential HRBlob to be created

Columns list: col1, col2, col3, measure1, measure2, measure3;
- Sorted by metadata columns, the order of sorting depends on predicates strength;
- All rest of metadata columns are illuminated;
- All rest of data columns are illuminated;

Fig. 8

METHOD AND SYSTEM FOR CREATION AND DYNAMIC UPDATING OF BEST DATA ARRANGEMENT IN DIGITAL DATA STORE SYSTEM

FIELD OF THE INVENTION

The invention relates to the field of digital data stores. More particularly, it relates to a system for supervision and management of digital data store systems in order to obtain the most efficient data arrangement and queries execution.

BACKGROUND OF THE INVENTION

One of the most important assets of an organization is its information. One of the most common forms to keep this asset today is using a Data Warehouse. The term Data Warehouse was coined by Bill Inmon in 1990. He defined it in the following way: "A warehouse is a subject-oriented, integrated, time-variant and non-volatile collection of data in support of management's decision making process". The fundamental goals of the Data Warehouse:

To make an organization's information accessible;
To make the organization's information consistent;
To be an adaptive and resilient source of information;
To be a secure bastion that protects the organization's information;
To be the foundation for decision making.

Data warehousing has not always delivered on the promise. There is a range of unmet challenges when dealing with data warehouse:

Identification of reporting needs by subject area and organization role;
Bridging the gap between reporting needs and technical specifications;
Meeting the expectations of the time it takes to implement
Defining an effective implementation strategy;
Measuring the impact goals, which have been too broadly defined;
Providing all the benefits promised, notably, e.g. easy end-user access to corporate data.

These problems have been further compounded because IT departments operate under pressure driven by quarterly corporate fiscal goals. This outlook is not conducive to the long-term process of fully implementing a data warehouse, which in some cases can take 18 months to three years. End users are hindered in their acceptance of data warehousing because they do not understand how it applies to their business and everyday jobs. They're not getting what they want or what they need. The problem lies in the lack of an adequate Customer Adoption Process: understanding the end users and their real needs, providing adequate resources to support their selection process and offering the follow-through implementation necessary to provide them with what they need, when they need it.

Despite the problems, as demand for responsive Business Intelligence (BI) and Business Performance Management (BPM) grows, global enterprises are still turning to data warehouses as their preferred source of data for analysis. The principle of gathering corporate data into a single, consistent store remains perfectly valid, but as businesses are constantly changing, the practice of traditional data warehousing can prove complex, costly and prone to failure. The fundamental problem is that traditional data warehousing methodology promotes stasis of the business model, but businesses thrive on change. The difficulty of reconciling these opposites is a major contributor to the fact that four in every ten data warehouse implementations are expected to fail. Conventional data warehousing wisdom says that you should plan for a lengthy and expensive implementation, that you will need an army of skilled project managers and technicians, and that you can forget about trying to reflect the changing state of your business: a data warehouse is static data in a static model, custom-built to meet fixed user requirements. However, in order to be able to adapt intelligently and at high speed to new competitive challenges, business users need access to information that remains consistent however much their organization is changing. The cost and time overheads of re-coding a conventional data warehouse to track every change in the business are prohibitive, so reporting in such an environment will always be delayed or inaccurate, and Business Intelligence initiatives will not deliver actionable conclusions.

Companies are moving to larger data warehouses and giving access to more internal and external users. With more people accessing more data, issues like scalability and performance are driving larger data warehouse investments. There is a lot of attention being focused on BI and its promise. Delivering on this promise requires sophisticated data warehousing strategies.

When the underlying data changes, then the data warehouse structure needs to change with it in such a way as to guarantee flexibility, consistency and synchronization. Therefore a valid question for a manager faced with the problem of choosing a data warehouse system for his company is: "Will your data warehouse technology choice be flexible and easily configurable to accommodate changes in business rules, requirements and data flow?"

A data warehouse requires a considerable amount of time to fully develop. In other words, it takes a long time to gain experience with the usual problems that develop at different phases of a data warehousing effort. Despite the best efforts to architect a data warehouse so "maintenance" demands are minimized, many data warehouses by their very nature require a great deal of care and feeding once they are in "production". It is important to note that successful data warehouse requires a lot of maintenance. Organizations that cannot or will not staff to meet these maintenance demands should think twice before they jump into the data warehousing business.

A data warehouse cannot be static. New business requirements arise. New managers and executives place unexpected demands on the data warehouse. New data sources become available. At the very least, a data warehouse needs to evolve as fast as the surrounding organization evolves. Dynamic, turbulent organizations make the data warehouse task more challenging. Given the churning, evolving nature of the data warehouse, expectations and techniques from the original idealistic static view must be adjusted. Flexible and adaptive techniques need to be designed into it.

One of the prior art solutions that attempts to provide solution to the aforementioned problems is called data warehouse appliance. This one, as its name suggests, is a preconfigured stack of hardware and software that includes an operating system, a dedicated storage platform, a relational database and a parallel processing engine. A data warehouse appliance derives its processing power from parallel architecture. These appliances have evolved to allow administrators to scale processing and data store size on demand, but not be subjected to the diminishing returns as the system is scaled out. Specifically MPP (Massive Parallel Processing) based appliances, also commonly referred to as shared nothing systems, are designed around the concept that data warehousing workloads and queries can be cleanly divided into separate independently executable and parallelized operations across a federated system. MPP systems are clusters of two or more Symmetric Multiprocessing (SMP) server nodes, where each node has its own operating system, memory and exclusive access to a partitioned data set. Queries sent to the data warehouse are de-constructed into parallel queries that are executed by individual nodes. The results of these parallelized queries are rolled up and summarized after each node completes it processing. Traditionally, MPP systems have offered near unlimited scalability, but this has come at the cost of high overall management and OPEX (Operating Expenses) cost to maintain a MPP system of significant scale. Typically, the setup for a MPP system is more complicated, requiring thought about how to partition a common data store among processors and how to assign work among the processors. Moreover, once partitioned, administrators must engage in ongoing tuning to ensure that data is redistributed and partitioned optimally across all nodes in the MPP system. This re-partitioning can be quite challenging if the data warehouse is growing rapidly and users are performing new and different types of queries periodically. As a result, the implementation and ongoing management costs of a MPP data store can run in the tens of millions of dollars. The drawback of data warehouse appliances is that they do not utilize main stream data store engines and do not integrate easily into existing environments, and often impose a rigid partitioning scheme on the data that limits the types of queries for which they deliver optimal results.

Typically, prior art systems expose limitations in queries processing since they do not adapt to changes both in queries and also to metadata and data properties changes (density, correlations etc.). These systems are not effectively "self-learning". Today, most of the systems use calculation on the fly and do not pre-aggregate the data. If they do pre-aggregate the data, it is on a very limited scale (i.e. selectively on specific queries) due to performance issue. Different systems of the prior art use "typical" queries, i.e. pre-defined queries (template reports) which support very narrow range. When a new (not pre-defined) query arrives, the prior art systems will use on the fly aggregation to answer them. This means that in the best case, costly full data scans and calculations will be processed each time a new query arrives, even if the query repeats. In the worst case this process may be very lengthy and many times will cause the users to abort the query before an answer is provided. In order to fix the situation, the system's supervisor takes an action and solves the problem by creating an appropriate summary table to deal with a new query. This is not a satisfactory solution since summary tables which are good for today's queries stream might become useless for the queries stream of tomorrow due to the highly dynamical nature of activities of information systems.

A very good summation of the development for the expectations of users of data warehousing systems is the following remark by IBM's Marc Andrews, program director of data warehousing for Big Blue. "We would characterize BI as having three generations. The first generation was about understanding the past. The second was about analyzing why things happened and making recommendations about the future. That's better than first, but I still liken this to driving a car by looking in the rear view mirror. The new, third generation is about making information available to the people in front of the customer."

This is a truly significant shift in the way enterprises use data warehouses. First- and second-generation systems needed to support a limited number of people who ran large, complex analytical queries.

If a system that is based on the assumptions that both the business model and reporting requirements are ever-changing were available, Enterprise leaders, seeking to improve the Return Of Investment of their management information initiatives, would no longer need to feel that BI/analysis reporting holds them back.

U.S. Pat. No. 6,438,537 describes a system which treats a query as it arrives into the system, including all specific parameters of the query. This approach may be useful in small systems with a low rate of arriving queries. Applying the method of query treatment taught in U.S. Pat. No. 6,438,537 to real world systems, in which queries arrive at the rate of tens or even hundreds a second, will result in poor performance in the best case and won't be possible in the worst case. This prior art system is able to set a parameter that indicates to the system to capture one out of every X queries. Working in this manner important information about the queries stream content may be lost and the effectiveness of the whole system workflow is reduced.

It is therefore a purpose of the current invention to provide a complementary system to an existing data store system that overcomes the deficiencies of prior art regarding BI and analysis by providing a system that is based on the assumption that both the business model and reporting requirements are ever-changing.

It is a purpose too of the current invention to enable data store users not only to obtain up to date business intelligence, but also to compare present, past and predicted performance, no matter what the business structure is at any given time.

It is yet purpose of the current invention to deliver a consistent view of the past and the present without requiring any costly changes to existing source systems.

It is a further purpose of the current invention to provide a system and method for more efficient data arrangement and queries management.

It is another purpose of the current invention to provide a system and method for automatic dynamic update of arranged data for effective execution of continuously changing queries.

Further purposes and advantages of this invention will appear as the description proceeds.

SUMMARY OF THE INVENTION

Throughout this specification, the following definitions are employed:
  Arrangement: In this document the word 'arrangement' is used to mean arrangement and/or aggregation and/or consolidation.
  Data Record: A collection of single data items, herein Data Record Coordinates, i.e. Data Record (Dimensional) Coordinates are the components of data record. In other words, a collection of data record coordinates defines the unique key of data record, which is to be used in data manipulations—search, arrangement etc. In Table 1, presented herein below a Data Record is represented as one of the numbered rows, and a Data Record Coordinate is represented by one cell of a Data Record.
  Fact Data: a collection of data records.
  Dimension: A metadata component that contains (dimension) members which categorize each data record in the data store (e.g. product, city, and color). For example in the above referenced Table 1, the Dimensions are represented by the columns "Customer", "Country", "Time" and "Product".
  Measure: a quantified parameter of a data record. For example in the above referenced Table 1, the Measure is represented by the column "Quantity".

Dictionary: A digital document that contains information the data store system requires to perform its functions and to support its particular implementation (e.g. dimensions, descriptions of tables and fields, access information, rules, procedures etc. . . . )

Query: A constrained request to retrieve information from a data store. The user sends queries to the data store and gets in return data. Usually the data in return is processed data, based on data from the data store.

HRBlob: A collection of arranged data stored as a single entity. HRBlobs may be stored internally as well as externally to the data store system. A HRBlob contains arranged data which is constructed from data extracted from the data store (or from another HRBlob). The HRBlobs are designated to be used in providing answers to queries that may be effectively executed with HRBlobs. The core product of the present invention is a collection of HRBlobs dynamically created using the method of the invention as described herein. Herein the phrases "HRBlob set", "HRBlob collection" and "HRBlob chain" are used interchangeably. They all are used to represent a collection of HRBlobs which are organized according to set of rules.

HRBlob Parent: A lowest HRBlob in a HRBlobs chain from which given HRBlob can potentially be derived.

Ancestor HRBlob: Any HRBlob from which another HRBlob can potentially be derived.

Query Reference List: list of all dimensions and all measures of a query.

HRBlob Reference List: list of all dimensions and all measures of a HRBlob.

HRBlobs system Reference List: list of all HRBlobs' reference lists.

HRBlobs Initial System Configuration: initial set of HRBlobs to be created in a new or redefined HRBlobs system.

The invention is a system comprising two modules, which perform automation procedures of the data store arrangement and queries treatment in a data store system. The automation procedures are based on creation and continuous updating of a hierarchical set of HRBlobs. The two modules are:

a. an Analytical Dynamic Mechanism (ADM) module, which comprises components adapted to be able to decide how to act on each query, to collect the statistics from both the complementary system and the existing system, to manage the configuration of the complementary system, to update the hierarchical set of HRBlobs, and to process instructions from the supervisor. The components of the ADM comprise:
 a Query Analyzer;
 a Statistics Collector;
 a Decision Maker; and
 optionally comprises one or both of the following components:
  a Queries Cache; and
  a Query Router;

b. a Data Arrangements Module (DAM), which comprises components adapted to be able to handle the data in the Data Store of the existing data store system and the HRBlob set, to load data from the Data Store into the complementary system, to perform the configuration and the updates of the HRBlobs according to instructions received from the ADM, to extract the relevant HRBlob to provide the response to the query, and to provide query execution statistics. The components of the DAM comprise:
 a Control Module;
 a Query Handler;
 a HRBlobs Storage component;
 a HRBlobs Handler component;
 a HRBlobs Arrangement Engine component;
 a Base Data Loader component; and
 an Execution Statistics Provider component.

The system of the invention can be a complementary system, which is added onto an existing data store system using the existing interface or an integrated system, which is integrated into a data store system.

In embodiments of the system, when the system is activated for the first time, the supervisor provides an initialization of the HRBlobs. In other embodiments, the system begins working without any prior knowledge of the data store contents and any existing summary tables.

Each HRBlob may consist of any subset of data store data records, with any subset of measures, and any subset and any combination of metadata dimensions, arranged in any order and in any level. Every HRBlob is designed to provide an effective answer to one or more specific query templates; wherein each user query is composed of requested dimensions in a certain order and the required measures.

In embodiments of the system the supervisor can address instructions directly to the Data Arranger of the data store system, but the queries will be processed only through the Data Arranger Module of system of the invention.

If the Data Store is dynamic and can change both in its content and in its properties, then the system of the invention automatically recognizes and adapts itself to the changes by updating the HRBlobs set. The updates can be either executed online either prior to a query, or while processing a query, or after the query was executed or can be executed offline.

In embodiments of the system of the invention:

The Query Analyzer analyses each query that is routed to the ADM, wherein the analysis includes content (syntactical) analysis and query properties for statistical collection.

The Statistics Collector collects and provides statistics on the content of the Data Store of the data store system and information on the dimensions and measures of each query and its environment properties. The Statistics Collector also collects statistics on each query execution, HRBlobs usage, and the Queries Cache usage.

The Decision Maker composes the initial system configuration, makes decisions concerning update of the system, and makes estimations of user benefit.

The Query Router decides for each given query whether to route the query to the DAM for answering the query using an existing HRBlob or to route the query to the Data Store to process the query in the same way as in the original data store system.

The Queries Cache receives each query and decides if this query result should be cached for future use, wherein the decision is based on a caching policy, which is chosen according to user system limitations and can be automatically changed by the system according to usage effectiveness.

In embodiments of the system of the invention:

The Control Module initiates and controls most of the actions of the components of the DAM.

The Query Handler receives a query from the ADM and transfers it to the HRBlobs Handler.

The HRBlobs Handler either extracts a prepared in advance HRBlob from the HRBlob Storage component, or if a new HRBlob is needed, transfers the appropriate instructions to the Arrangement Engine.

The Arrangement Engine creates the needed new HRBlob according to instructions received from the Control Module, wherein the instructions are derived from the Initial System Configuration and/or from offline/online update instructions.

The Base Data Loader loads fact data and dictionary data from the Data Store of the existing data store system into the Arrangement Engine.

The HRBlobs Storage component stores HRBlobs created by the arrangement engine.

The Execution Statistics Provider compiles and transfers statistics of query executions to the Statistics Collector in the ADM.

In embodiments of the system of the invention a query from a user is converted in the Support Mechanisms of the data store system to the syntax of the system of the invention and then transferred to the ADM wherein, if there is an existing HRBlob to answer the query, the Query Router in the ADM will transfer the query to the DAM. In embodiments of the system of the invention, if there is no existing HRBlob to answer the query, a new HRBlob can be created to answer the query. In other embodiments, if there is no existing HRBlob to answer the query, the query is routed to the Data Store of the data store system to be processed in the normal way.

If there is no Query Router in the ADM or it is not being used, then the Control Module in the DAM receives instructions for the current query handling from the Decision Maker component in the ADM and accordingly addresses the relevant components in the DAM.

Queries can be processed by the system of the invention either online or offline.

The system of the invention can provide an initial HRBlobs System configuration comprising a potential benefits report, an arrangement execution report, and a potential queries execution report to the supervisor without the configuration being physically implemented. This allows the supervisor to decide if the current HRBlobs configuration, either in its entirety or partially, is useful for his users or not.

The system of the invention considers queries to be inherently nested queries and an algorithm in the ADM module looks at each incoming query and analyses each sub-query, at any level, of the incoming query individually as a separate entity.

All the above and other characteristics and advantages of the invention will be further understood through the following illustrative and non-limitative description of preferred embodiments thereof, with reference to the appended drawings.

BRIEF DESCRIPTION OF THE DRAWINGS

FIG. 8 schematically describes the Identification and Unification of Queries Templates process

DETAILED DESCRIPTION OF PREFERRED EMBODIMENTS

Figure 1:
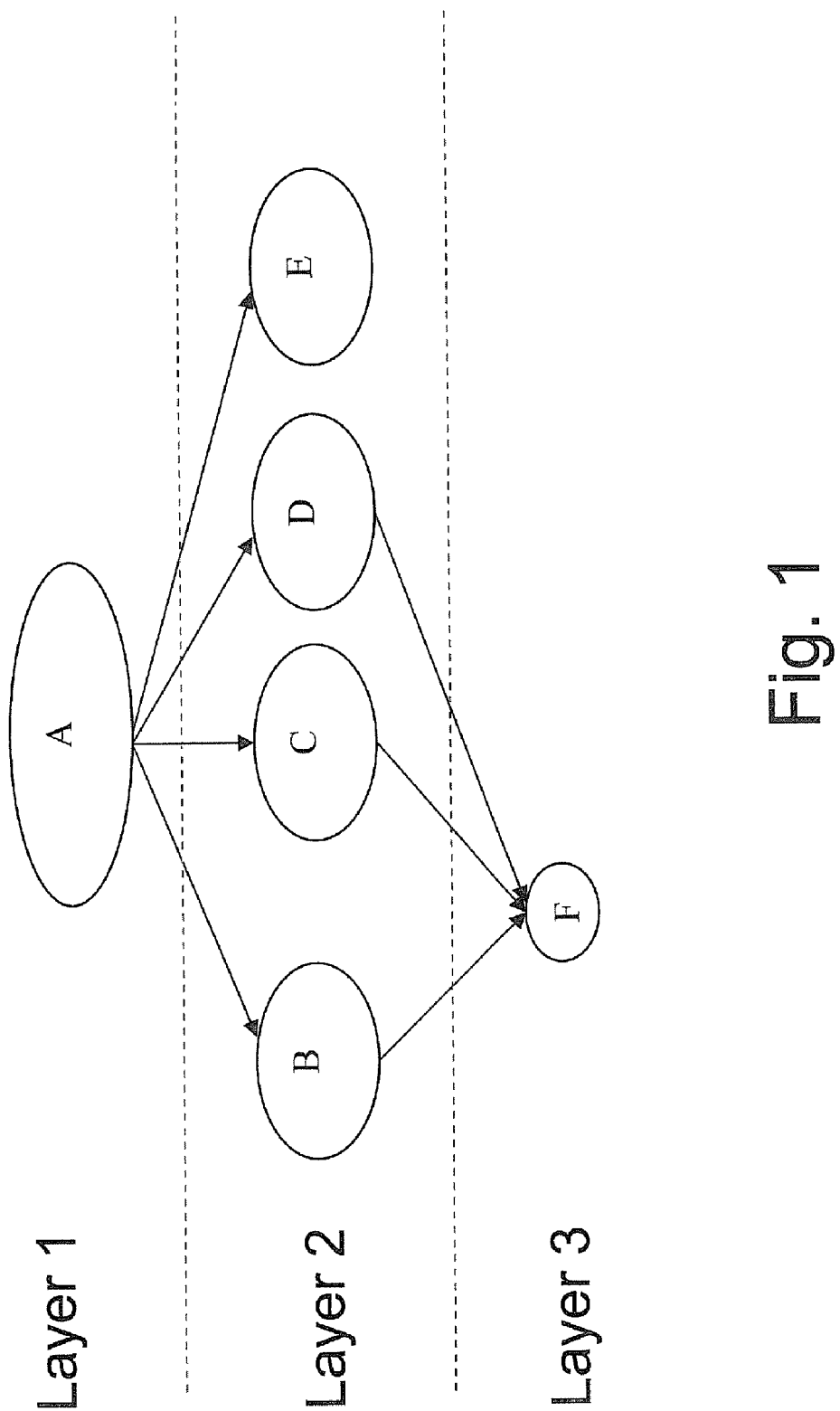
FIG. 1 shows an extremely simplified example in order to illustrate the principle of a HRBlob set.

The current invention is a method and a system for analyzing templates of queries, with different levels of precision. When the system of the current invention takes a decision to arrange data, these templates are used, and a single data arrangement object (HRBlob) is designed which may serve a single template or several templates and not just a single query. This approach has an important impact on data arrangement performance and on queries performance, since this approach may help many more queries to be handled using less data arrangement objects. The present invention was conceptualized and is described herein as a complementary system, which is added onto an existing data store system using the existing interface in order to overcome the above-mentioned drawbacks of the prior art with minimum investment and system changes; however skilled persons will recognize that the invention can also be integrated into a data store system.

The efficiency of a data store system is measured by its performance, i.e. the availability of the desirable information and its retrieval time. Data stores which are being constantly updated with mass data and for which the users' activities are constantly changing and getting more complex require tighter supervision in order to fulfill their objectives in the best way. The complementary system of the invention delivers a clearer and more effective performance throughout changes, and thereby saves processing time and provides more efficient query handling for BI analyses when compared to the data store system with which it is used. With conventional data warehousing methodology, the degree of flexibility provided by the system of the invention is at worst unfeasible, and at best expensive and slow to build.

Frequent information update, large data volume and high dimensionality structure require a data store to have an intelligent dynamically adaptive data arrangement mechanism in order to be as efficient as possible. The system of the invention is designed to allow new flexibility in the mechanism of data arrangement. One of the main goals of the present invention is to give the arrangement procedure dynamic properties which do not exist today, and give it the ability to work better in real world information systems.

The main core of the invention is effective high performance arrangement of the data required to provide answers to queries in a set of HRBlobs. The arrangement is done automatically by the modules of the system, as will be described herein below. When the system of the invention is to be applied to an existing data store for the first time, the supervisor can provide an initialization of the HRBlobs. Alternatively the system of the invention can begin working without any preliminary initialization stage, i.e. without any prior knowledge of the data store contents and the existing summary tables. If an initialization stage is executed or not, the HRBlobs are continuously automatically updated "on-the-fly" by the system of the invention. In both embodiments a supervisor may provide, at any time, any instructions he feels are necessary to the system of the invention.

The HRBlobs system of the invention comprises a set of HRBlobs, wherein each HRBlob consists of any subset of data store data records, with any subset of measures, and any subset and any combination of metadata dimensions, arranged in any order and in any level. A HRBlob comprises dimensions (e.g. name, address, product, color, etc. . . . ) and measures (e.g. quantity, weight, size, price, etc. . . . ), which are recalculated according to changes in the data record coordinates. The HRBlobs are organized according to a hierarchy (HRBlob layers). A root HRBlob holds a complete selected subset of data, comprising a complete selected subset of measures and dimensions. A HRBlob is derived from its ancestor by taking a subset of the ancestor's dimensions and measures, and arranging the data according to this subset and according to instructions from the ADM, as will be described herein below. A HRBlob can be derived from any of its ancestors or parents in the HRBlobs hierarchy. A decision making process that is driven by performance chooses the most appropriate ancestor for this purpose.

FIG. 1 shows an extremely simplified example in order to illustrate the principle of a HRBlob set. The given example contains a HRBlob set architecture comprising a three layer hierarchy. The composition of the various HRBlobs for this example is detailed in the following tables. Each HRBlob is an independent entity in the HRBlobs set, and may have its own properties like dimensions, measures, level of arrangement and so on.

Table 1 describes HRBlob A, which is the root HRBlob and therefore is at the highest hierarchy layer. HRBlob A contains five columns, i.e. four dimensions ('Customer', 'Country', 'Time', 'Product') and one measure ('Quantity'). Every data record is a unique event which is composed of a unique combination of dimensions, meaning there are no two identical rows.

TABLE 1

HRBlob A

| | Customer | Country | Time | Product | Quantity |
|---|---|---|---|---|---|
| 1 | Anat | US | 1.1.05 | Cola | 8 |
| 2 | Anat | US | 2.1.05 | Cola | 11 |
| 3 | Marina | Israel | 1.1.05 | Cola | 7 |
| 4 | Marina | Israel | 3.1.05 | Cola | 6 |
| 5 | Shahar | Israel | 2.1.05 | Cola | 3 |
| 6 | Shahar | Israel | 2.1.05 | Fanta | 4 |
| 7 | Victor | Israel | 3.1.05 | Sprite | 10 |

Table 2 describes HRBlob B, which is derived from HRBlob A. Thus, HRBlob A is the ancestor of HRBlob B. HRBlob B contains the dimensions "Customer" and "Product" and the measure "Quantity". The reduction in the number of dimensions results in less unique events than in HRBlob A. Correspondingly, the Quantity measure is updated (aggregated). For instance, rows 1 and 2 from HRBlob A are joined into row 1 in HRBlob B. Correspondingly, the measure has been aggregated, i.e. Quantity[B1]=+Quantity[A2], where (Quantity[B1] means the data in column 'Quantity' at row 1 of HRBlob B). The rest of HRBlob B is created following the same principle.

TABLE 2

HRBlob B

| | Customer | Product | Quantity |
|---|---|---|---|
| 1 | Anat | Cola | 19 |
| 2 | Marina | Cola | 13 |
| 3 | Shahar | Fanta | 4 |
| 4 | Shahar | Cola | 3 |
| 5 | Victor | Sprite | 10 |

Table 3 describes HRBlob C. HRBlob C contains the same data as HRBlob B. The difference between those HRBlobs is in the order of the dimensions. The system of the invention will create a HRBlob with different dimension order for the sake of efficiency. In large scale databases, creating blobs in this way saves significant time in responding to queries since the system can go immediately to the HRBlob in which the dimensions relevant to the query are located (and thus are sorted) in the first columns instead of having to search through the entire blob.

TABLE 3

HRBlob C

| | Product | Customer | Quantity |
|---|---|---|---|
| 1 | Cola | Anat | 19 |
| 2 | Cola | Marina | 13 |
| 3 | Cola | Shahar | 3 |
| 4 | Fanta | Shahar | 4 |
| 5 | Sprite | Victor | 10 |

Table 4 describes HRBlob D, which is composed of the dimensions "Country" and "Product", and the measure "Quantity".

TABLE 4

HRBlob D

| | Country | Product | Quantity |
|---|---|---|---|
| 1 | Israel | Cola | 16 |
| 2 | Israel | Fanta | 4 |
| 3 | Israel | Sprite | 10 |
| 4 | US | Cola | 19 |

Table 5 describes HRBlob E, which is composed of the dimension 'Time' and the measure 'Quantity'.

TABLE 5

HRBlob E

| | Time | Quantity |
|---|---|---|
| 1 | 1.1.05 | 15 |
| 2 | 2.1.05 | 18 |
| 3 | 3.1.05 | 16 |

HRBlobs B, C, D and E are derived directly from HRBlob A and can't be derived from other HRBlobs; therefore they are placed in the second hierarchy layer, as illustrated in FIG. 1.

Table 6 describes HRBlob F. HRBlob F could be derived from any one of its parent HRBlobs A, B, C or D. The ancestor HRBlob from which it is derived is determined according to rules provided to the ADM, to be described hereinbelow. According to the derivation rules, HRBlob F is placed in the third hierarchy layer in the HRBlob hierarchy.

TABLE 6

HRBlob F

| | Product | Quantity |
|---|---|---|
| 1 | Cola | 35 |
| 2 | Fanta | 4 |
| 3 | Sprite | 10 |

A user query is composed of requested dimensions in a certain order and the required measures. Every HRBlob is designed to provide an effective answer to one or more specific query templates. The reference list of a query is composed and compared to the reference list of the system of the invention, which comprises the HRBlobs structures. In this way, the system of the invention can draw the specific HRBlob required to answer the query efficiently. For instance, in the abovementioned example, if a query contains only the dimension "Product" and the measure "Quantity", the system of the invention will answer the query using HRBlob F. Although the desired data can be found also in HRBlobs A, B, C and D, HRBlob F will provide the fastest answer, since no additional processing procedures are needed.

Figure 2:
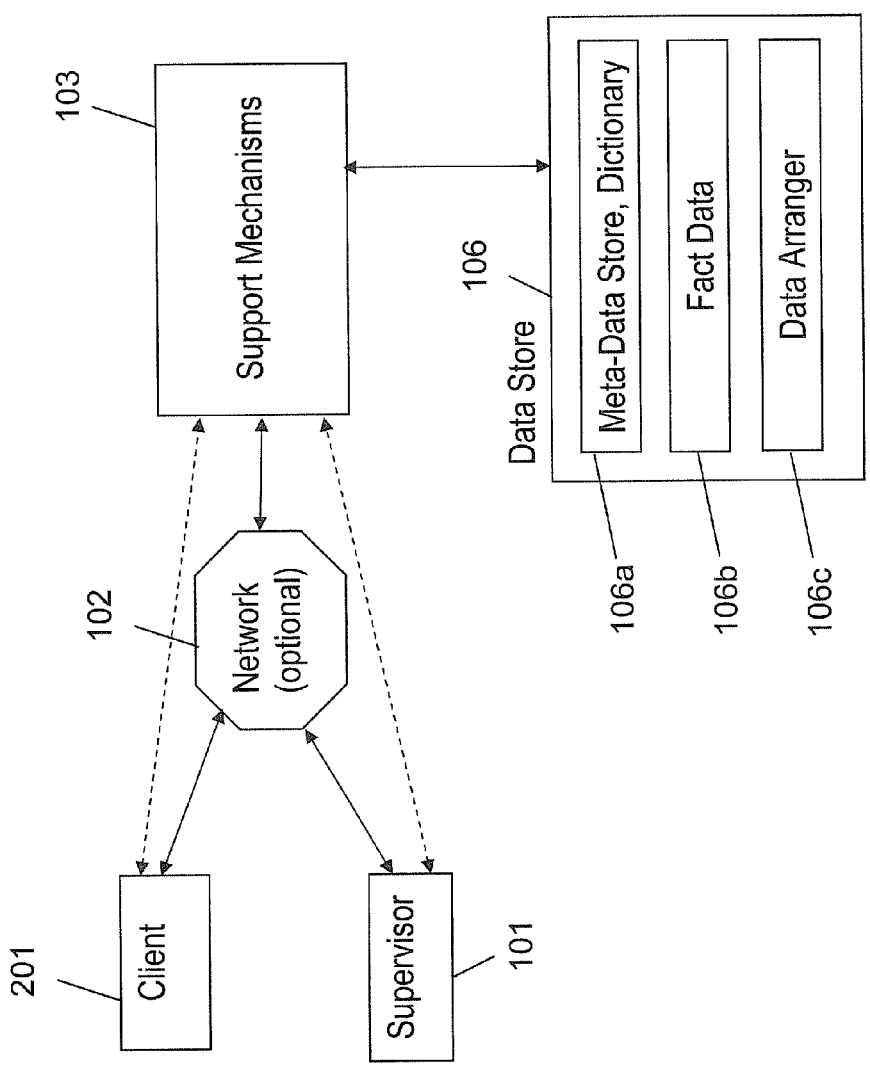
FIG. 2 illustrates a typical embodiment of a prior art data store system.

FIG. 2 illustrates a typical embodiment of a prior art data store system. The system comprises Data Store 106, which contains the Meta Data Store and Dictionary 106a, Fact Data 106b and Data Arranger 106c. The data is arranged and managed according to settings and instructions that are provided by the Supervisor 101 to Data Arranger 106c. The Client 201, i.e. end user, submits queries to extract the required data from Data Store 106. Both Supervisor 101 and Client 201 address the data store using Support Mechanisms 103. Support Mechanisms 103 holds all the mechanisms and logic for managing and using the Data Store 106. Addressing the Support Mechanism 103 can be done through a Network 102 and/or directly (dashed lines). The management of the data arrangement is done by the Supervisor 101, meaning that Supervisor 101 defines and creates summary tables, by addressing instructions to Data Arranger 106c, according to the needs of Client 201.

Figure 3:
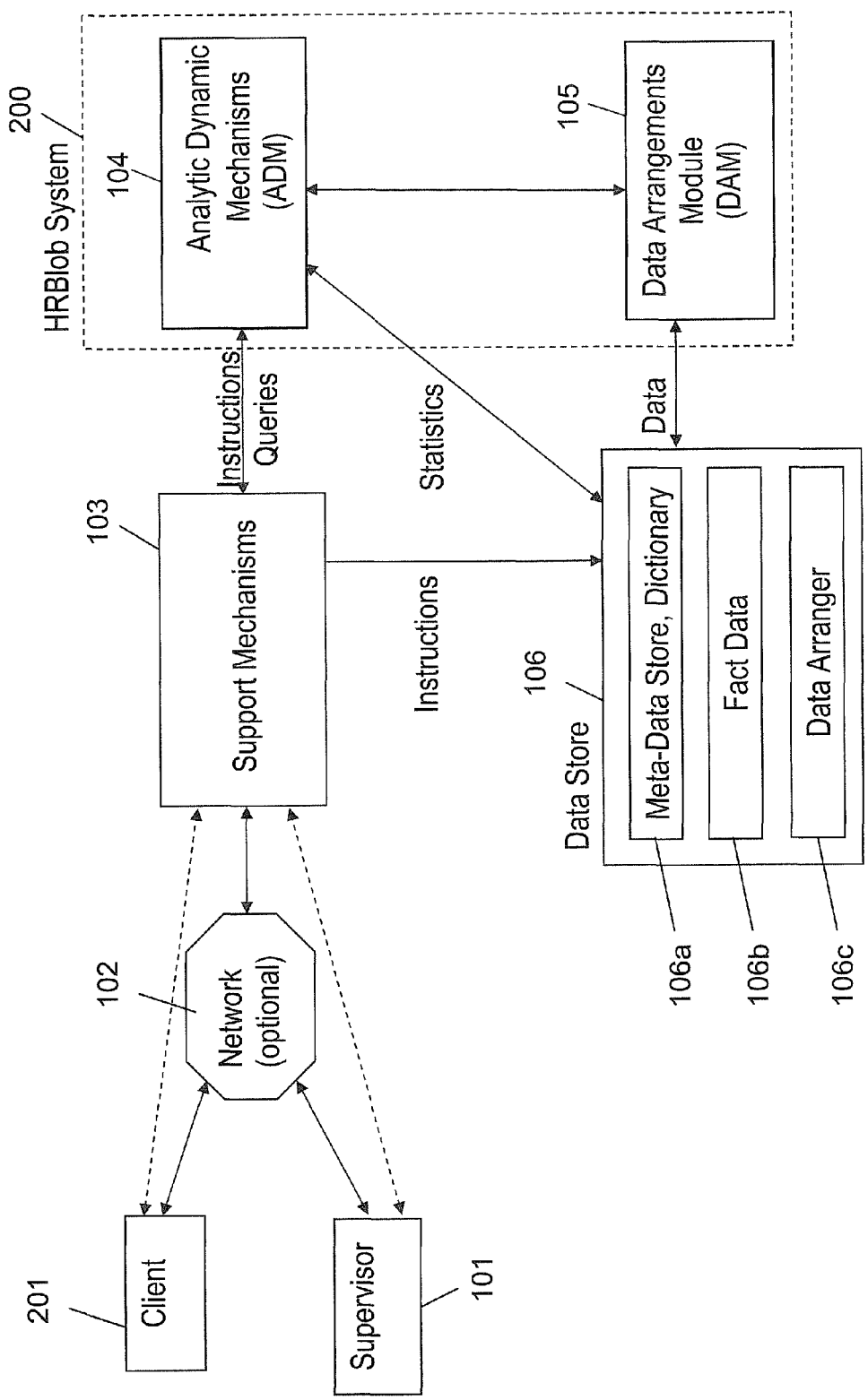
FIG. 3 schematically shows the system of the invention.

FIG. 3 schematically shows the system of the invention. The invention is shown as a complementary system, which is added to an existing data store system using the existing interface. The system comprises all components of the prior art system, as described in FIG. 2, and two additional components. The two additional components, which comprise the HRBlob System 200 are the Analytic Dynamic Mechanisms (ADM) 104 module and the Data Arrangement Module (DAM) 105. HRBlob System 200 is unique to the invention and performs the automation procedures of the data store arrangement and the queries treatment.

HRBlob System 200 takes tasks that were performed by the supervisor away from him and performs them automatically in order to obtain efficient data arrangement for queries execution usage. The system of the invention is also used as a management advisor and a tool to provide recommendations on data arrangement for efficient queries process, and also as data arrangement execution mechanism. The supervisor 101 can still address instructions directly to the Data Arranger 106c, but the queries will be processed only through the HRBlob System 200. Each component of the HRBlobs System 200 can be configured to operate completely automatically by supervisor 101.

The data store Supervisor/s 101 controls the system either through the Network 102 or directly (dashed line) through the system interface, which is part of Support Mechanisms 103. Optionally, the Supervisor 101 provides setup configuration, which includes the set of expected queries and/or metadata and/or data and/or statistics of system usage, etc. to the Analytic Dynamic Mechanisms (ADM) 104, which will be described in detail with respect to FIG. 4. ADM 104 collects statistics from Data Store 106 and initializes the HRBlobs set that will provide the best response to queries under the given constraints. The configuration of the system of the invention is stored in the Data Arrangement Module (DAM) 105, which will be described in details with respect to FIG. 5. ADM 104 performs the analysis and makes the decisions in the HRBlob System 200, and DAM 105 executes the operations according to instructions from the ADM 104.

The data store is dynamic and can change both in its content and in its properties (e.g. dimensions). Such changes will cause slowing down of the present queries performance. They also mean that some of the queries will become irrelevant and probably new ones will take their place. In most prior art systems, the data store administrator/supervisor must take an action by modifying the existing summary tables or creating new ones. In the present case, the system of the invention will automatically adapt itself to the changes. When a change occurs, it will be recognized and will be treated by the system of the invention, as described with respect to FIG. 6B.

There are two approaches taken by the system of the invention for updating the HRBlobs: offline and online system updates. ADM 104 collects usage statistics of the system of the invention, e.g., efficiency of query response, usage of existing HRBlobs, Data Store updates etc., and then it updates the system of the invention configuration in DAM 105 so it will provide maximum increase in system performance. Some updates are done offline, whenever the system of the invention "feels free" to do them, i.e. when there are free resources, low queries stream, etc. The most profitable and cost acceptable updates are those that are done online in order to bring immediate benefit to the user. Online updates may be executed prior to a query, while processing a query, or after the query was executed.

Figure 4:
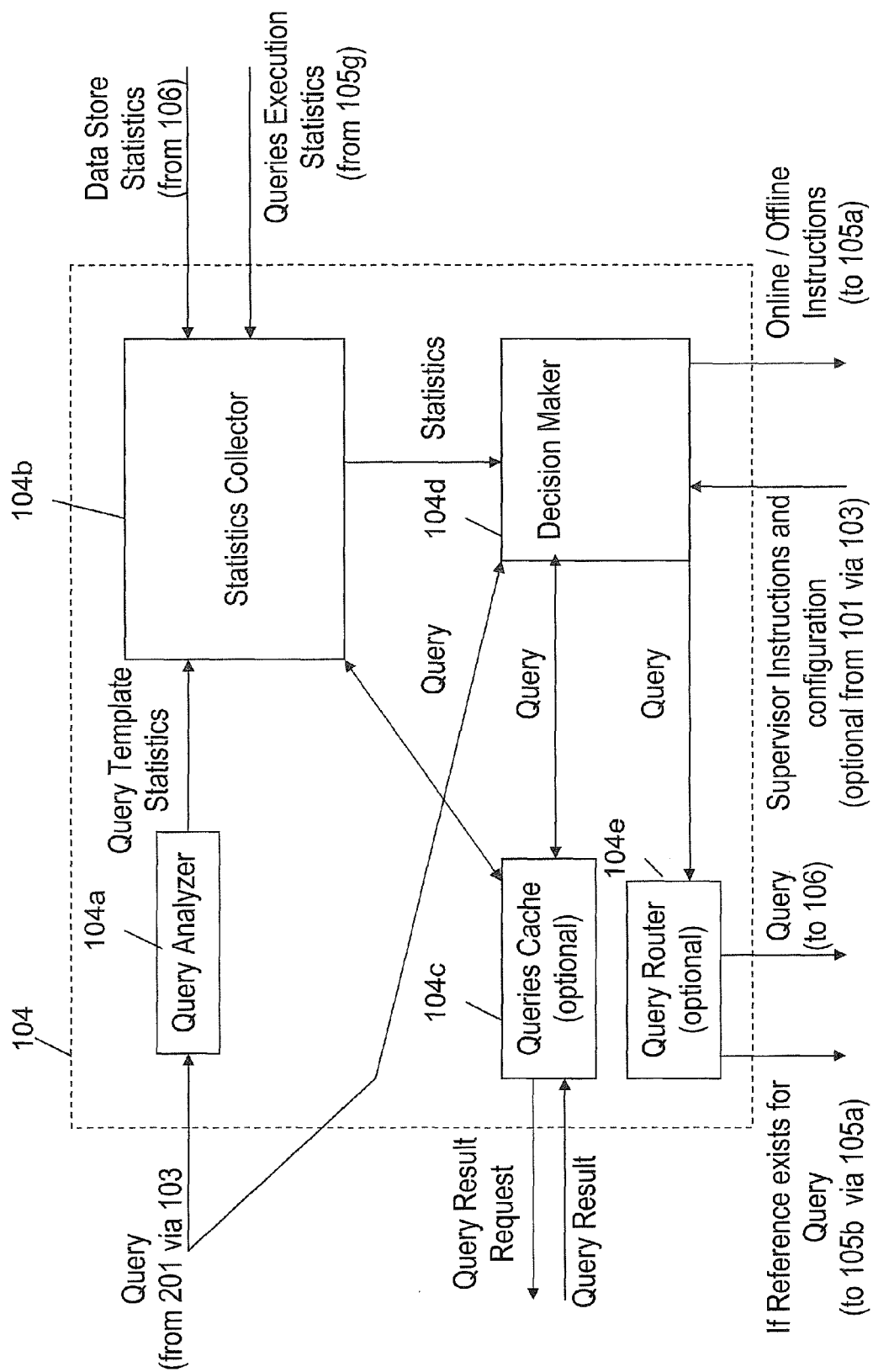
FIG. 4 schematically shows the principal components and the information flow route in the Analytic Dynamic Mechanisms (ADM) module.

FIG. 4 schematically shows the principal components and the information flow route in the Analytic Dynamic Mechanisms (ADM) 104. The ADM 104 is responsible for deciding how to act on each query. It also collects the system's statistics. Further functions of the ADM 104 are described herein. ADM 104 comprises several components:

Query Analyzer 104a;
Statistics Collector 104b;
Queries Cache 104c;
Decision Maker 104d; and
Query Router 104e.

Query Analyzer 104a analyses each query that is routed to the ADM 104. The analysis includes content (syntactical) analysis, query properties like sender, dimensions and so on for statistical collection.

Statistics Collector 104b collects and provides statistics on the content of Data Store 106 and information on the dimensions and measures of each query and its environment properties. Statistics on each query execution, HRBlobs usage, and Queries Cache 104c usage are also transferred to Statistics Collector 104b.

Queries Cache 104c is an optional component since there may be reasons, e.g. physical resources limits such as the size of memory allocated for the system of the current invention by a user, for not using it.

Decision Maker 104d performs the most important function of the ADM 104. This component is responsible for composing the initial system configuration, to make decisions concerning update of the system, and to make and provide to the user estimations of user benefit, i.e., how much time/money was saved due as a result of using the system of the invention.

Decision Maker 104d is a management tool that the current invention provides for users. A user of a system like the HRBlobs system would be interested in knowing what the exact benefit is to his organization from using the HRBlobs system and, indeed, if there is any benefit at all. Due to the management tool provided, i.e. Decision Maker 104d, the system of the current invention becomes more reliable and trustworthy and allows the user to perform effective configuration tuning of the current invention system continuously during the system's lifetime, which leads to more significant benefits for the user's company.

The Query Router 104e component (optionally) decides for each given query whether to route the query to DAM 105 for answering the query using an existing HRBlob or to route the query to Data Store 106 to process the query normally, i.e. the same way as in the original system. When Query Router 104e is not used, the query is always executed in HRBlobs System 200.

An additional way to improve queries performance is to use Queries Cache 104c. The Queries Cache 104c receives each query and decides based on some caching policy, which is chosen according to user system limitations and can be automatically changed by HRBlobs system according its usage effectiveness, if this query result should be cached for future use. Use of Queries Cache 104c is optional.

Figure 5:
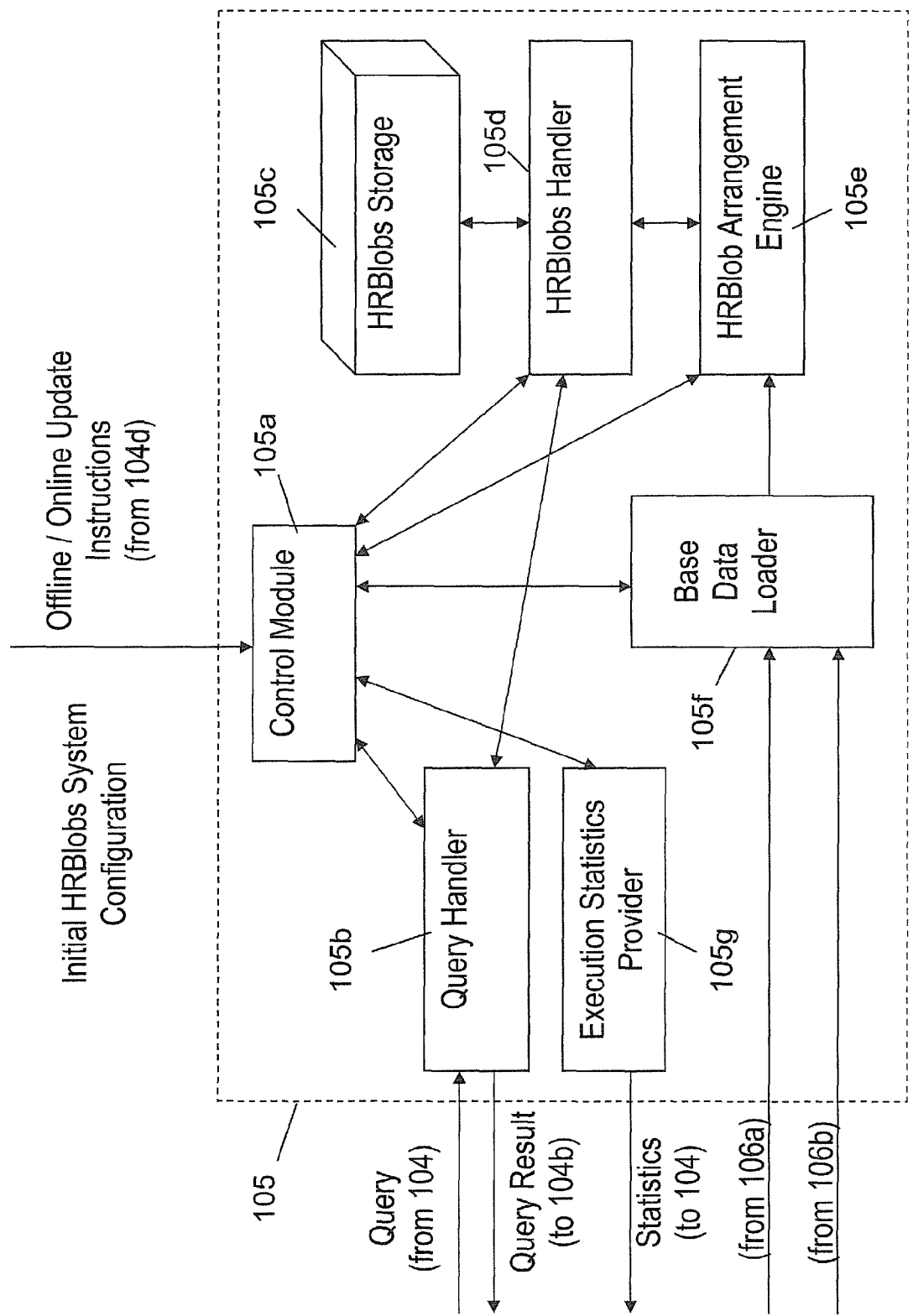
FIG. 5 schematically shows the principal components and the information flow in the Data Arrangement Module (DAM)

FIG. 5 schematically shows the principal components and the information flow in the Data Arrangement Module (DAM) 105. The DAM 105 handles the HRBlob set. DAM 105 performs the configuration and the updates of the HRBlobs, and extracts the relevant HRBlob according to the routed query. DAM 105 comprises several components:

Control Module 106a;
Query Handler 105b;
HRBlobs Storage 105c;
HRBlobs Handler 105d;
HRBlobs Arrangement Engine 10e;
Base Data Loader 105f; and
Execution Statistics Provider 105g.

Control Module 106a initiates and controls most of actions of the DAM components. A query is converted in the Support Mechanisms 103 to the HRBlobs System 200 syntax and then transferred to ADM 104. The Query Router 104e in ADM 104 will transfer the query to DAM 105 if there is an existing HRBlob to answer the query. If there is no Query Router 104e or it is not being used, then Control Module 106a receives instructions for the current query handling from Decision Maker 104d in ADM 104 and accordingly addresses the relevant components in DAM 105. In both cases, Query Handler 105b receives the query from ADM 104 and transfers it to the HRBlobs Handler 105d to either extract a prepared in advance HRBlob from HRBlob Storage 10c, or if a new HRBlob is needed, the appropriate instructions are transferred to Arrangement Engine 105e, which creates the desired new HRBlob. The statistics of query executions are compiled by Execution Statistics Provider 10g, which transfers the statistics to Statistics Collector 104d in ADM 104. Base Data Loader 105f is responsible for loading fact data and dictionary data from Data Store 106 into Arrangement Engine 105e. Arrangement Engine 105e arranges the data (i.e. creates HRBlobs) according to instructions from Control Module 106a, which are derived from the Initial System Configuration and/or from offline/online update instructions. HRBlobs are stored in HRBlobs Storage 105c.

Figure 6A:
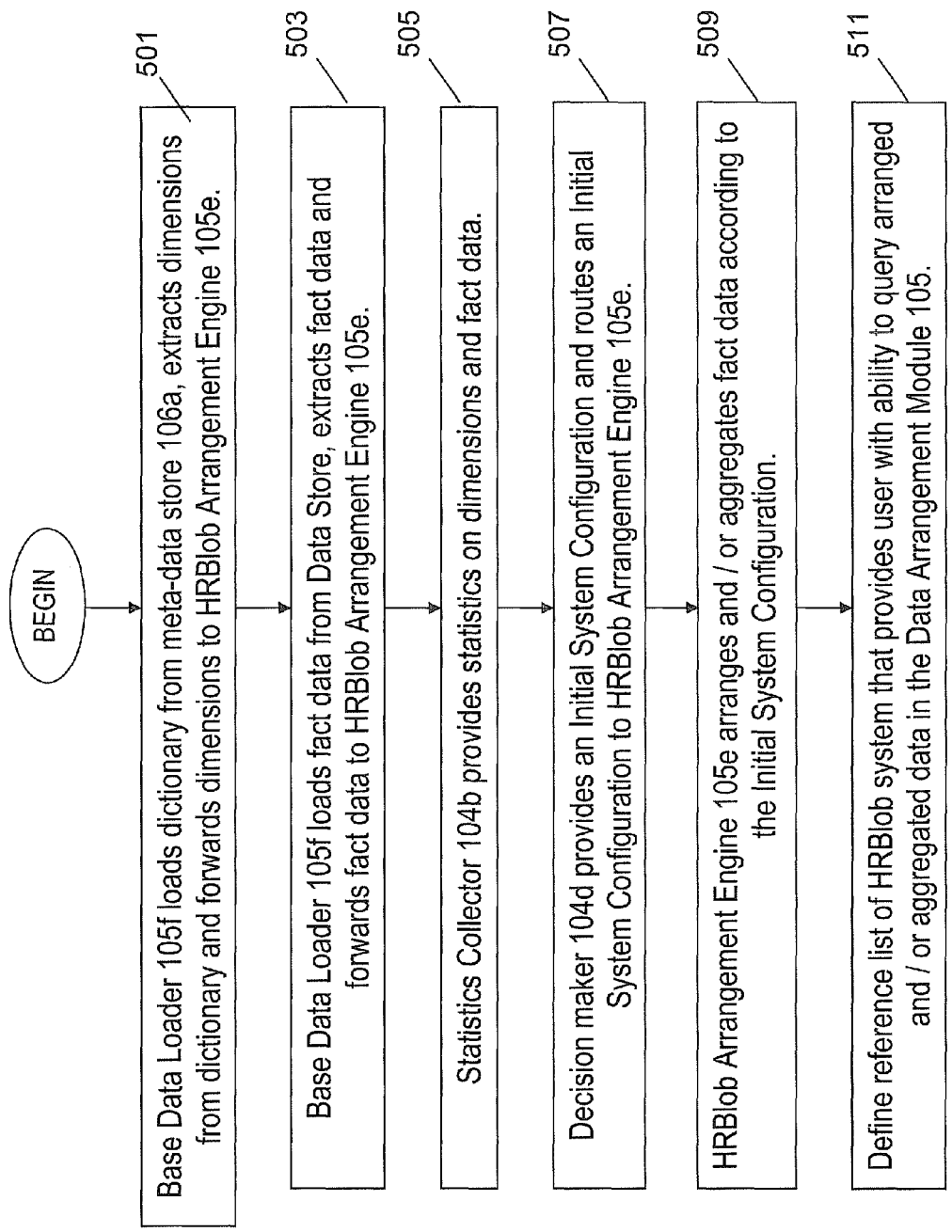
FIG. 6A is a flow chart that schematically shows the initialization flow of the system of the invention.

FIG. 6A is a flow chart that schematically shows the initialization flow of the system of the invention. The system's architecture, as illustrated in FIGS. 3, 4 and 5, executes the flow as shown in this figure. There are two parallel goals in composing the initial configuration of the system of the invention. The first goal is to reduce the execution time for most of the queries to some limit, i.e. below a predetermined upper bound, which is acceptable to the user. The second goal is to bring the average time of query response to the minimum within execution limits.

The initialization stage is optional, but it may be helpful in order to obtain the best starting point for effectively using the system. In step 501 Base Data Loader 105f loads the dictionary from Meta Data Store 106a, extracts dimensions from the dictionary and forwards the extracted dimensions to HRBlob Arrangement Engine 105e. In step 503 Base Data Loader 105f loads Fact Data 106b from Data Store 106, extracts fact data and forwards fact data to HRBlob Arrangement Engine 105e. In step 505 Statistics Collector 104b provides statistics on dimensions and fact data to Decision Maker 104d to be used in the initial configuration of the HRBlobs System 200. In step 507 Decision Maker 104d provides an Initial System Configuration and routes an Initial System Configuration to HRBlob Arrangement Engine 10e. In step 509 HRBlob Arrangement Engine 10e arranges fact data according to the Initial System Configuration from step 507. In step 511 a reference list of properties is defined that provides the user with the ability to query the existing HRBlobs and/or the aggregated data in the DAM 105.

There exists an option where an initial HRBlobs System configuration containing potential benefits report, arrangement execution report, and potential queries execution report is given to the supervisor without being physically implemented. According to this information the supervisor may decide if the system of the current HRBlobs configuration of the current invention is useful for his users or not.

The initial system configuration is determined by analyzing Data Store and by supervisor's hints, i.e. a set of frequently asked queries, etc. The system configuration (step 507) and the reference (step 511) are continuously updated as described herein above, i.e. whenever a new query arrives, it is analyzed and may cause a creation of one or more new HRBlobs, and optionally deletion of existing HRBlob(s). The updating process can be done immediately, i.e. online, or when the system "feels free" to execute updates, i.e. offline.

Figure 6B:
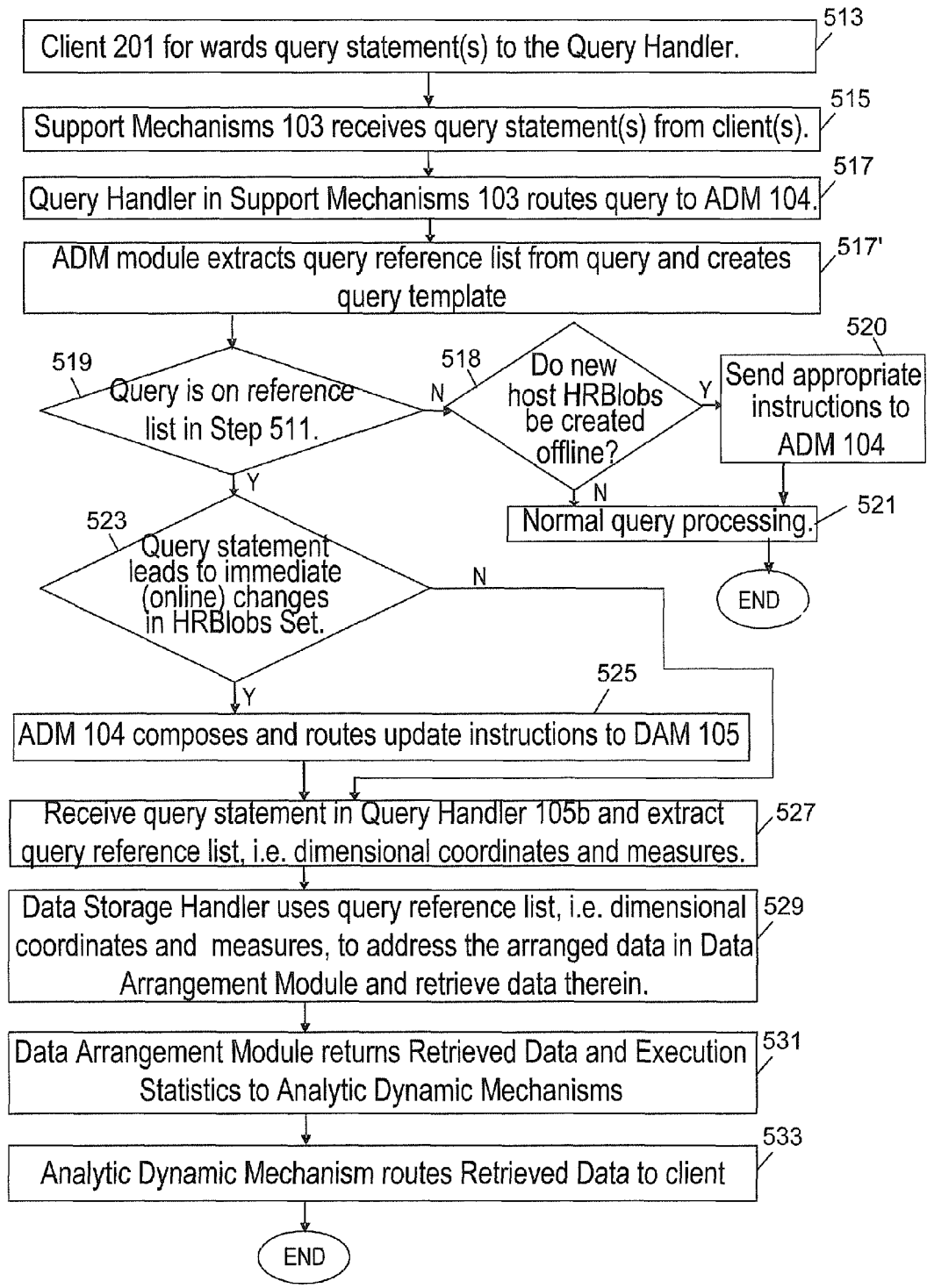
FIG. 6B is a flow chart that schematically shows the Query Execution Flow.

FIG. 6B is a flow chart that schematically shows the Query Execution Flow. The work flow shown in FIG. 6B is executed by the architecture of the system of the invention as illustrated in FIG. 3. A data store system serves many clients/users according to the enterprise's needs. Client 201 can address his query through the Network 102 or directly through the Interface in Support Mechanisms 103 (step 513). The query is managed by the Query Handler in Support Mechanisms 103, which receives the query and translates it into the "language" (syntax) used in the ADM 104 (step 515). The query is then routed to ADM 104 (step 517), which decides the most efficient way to answer the query (step 519) and sends the query to the chosen component (steps 521 and 523), which produces an appropriate answer (steps 521, 525, 527, 529, and 531) and sends it back to the user (steps 521 and 533). In some embodiments, the ADM 104 (step 517') extracts a query reference list from the query and creates a query template.

In step 519 the reference list prepared in step 511 (see FIG. 6A) is consulted to see if the query can be handled by the HRBlobs system. If the answer is "no" then the system of the invention won't attempt to generate an answer to the query, which is routed to Data Store 106 to be processed in the normal way (step 521). In some embodiments, if the answer is "no" then the system determines whether new host HRBlobs are to be created offline (step 518). If the answer is "no" then the system will not attempt to generate an answer to the query, which is routed to Data Store 106 to be processed in the normal way (step 521). If the answer is "yes" then the system sends appropriate instructions to ADM 104 (step 520) and performs normal query processing (step 521). If the answer in step 519 is "yes", then Decision Maker 104d considers if a query statement leads to immediate changes in the HRBlobs set in HRBlobs Storage 10c component (step 523). If the answer is "yes", then ADM 104 composes and routes instructions to DAM 105 in step 525, i.e. a new HRBlob is configured in order to answer the query. If the answer in step 519 is "no", then there exists a HRBIob that can supply an appropriate answer to the query. In this case the workflow goes forward to step 527 in which a query statement is received by Query Handler 10*b* and its dimensional coordinates are extracted. In step 529 HRBlobs Handler 10*d* uses the dimensional coordinates extracted in step 527 to address the arranged data in HRBlob Storage 10*c* and retrieve the appropriate HRBlob therefore. In step 531 DAM 105 routes the retrieved HRBIob and Execution Statistics to ADM 104. This retrieved HRBIob and Execution Statistics may (optionally) be routed to Queries Cache 104*c*. In the last step 533 the retrieved HRBlob is routed to client 201 via the Query Handler in Support Mechanisms 103, which receives the HRBIob and translates it into a response to the query that can be understood by client 201.

The present invention takes an innovative approach for treatment of nested queries. Queries are considered to be inherently complex (referred to as nested queries herein) and an algorithm in the ADM module looks at each incoming query and analyses each of incoming query's sub-queries (at any level) individually as separate entities. ADM takes into account possible optimizations in such complex query execution that may be applied by original Data Store Queries Execution engine, and extracts such optimized query flow. For example, if a query is composed of a root query and a subquery, and the ADM decides that the subquery would be better performed by the Data Store Queries Execution engine of the original data store system but the root query would be better performed by that of the current invention, then ADM sends the subquery to be executed in the original Data Store Queries Execution engine, receives a result for the subquery, and then executes the root query in the system of the current invention using this result. As another example, the ADM module may decide to create one or more HRBlobs only for one or more sub-queries of a given query and not for the entire query.

Figure 7:
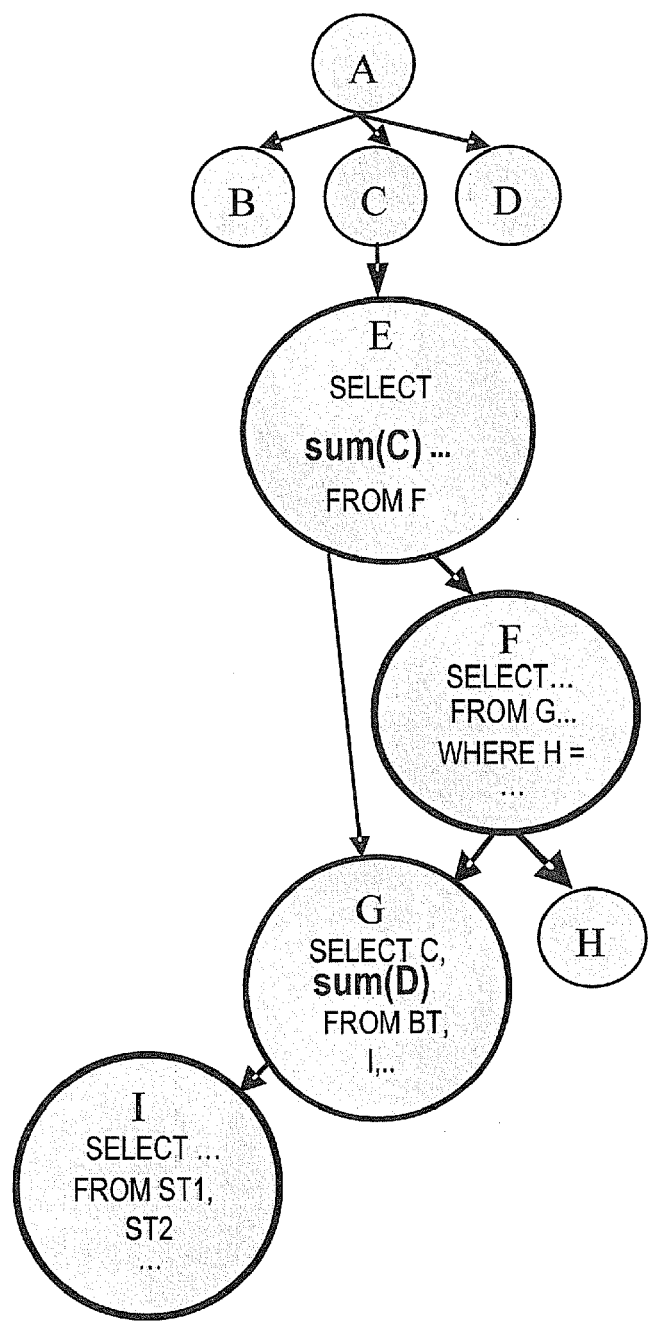
FIG. 7 illustrates analysis of nested queries.

FIG. 7 illustrates analysis of nested queries. A nested query is defined as an object, and each sub-query is a sub-object of the whole query, and can be seen and treated as an independent part within a given query. The structure of a nested query object consists of sub-queries. Nested query object has the structure of tree, where each node is a simple sub-query, or a root of a sub-query. For instance, A is a root of the whole nested query, F is a root of a nested sub-query F-G-I, F-H, and I is a simple (not nested) sub-query.

The FIG. 7 shows how sub-query candidates for an improvement are identified. For example, a sub-query that implies aggregation of massive data can be potentially improved. This improvement will result in the improvement of the whole query. Sub-query X is a child of sub-query Y if Y contains X as an immediate sub-query. X can refer to any asked (calculated) column down the tree of nested query. For example, E contains aggregative function that refers to the fields that is asked in G.

Typically, prior art systems, e.g.: that taught in U.S. Pat. No. 6,438,537 herein above use queries as they are, with all their parameters and values, for potential data arrangement purposes. The current invention proposes a method of analyzing templates of queries, with different levels of precision. FIG. 8 illustrates a method of identification and unification of Queries Templates that is usual in embodiments of the present invention. This example works with two queries, Query 1 and Query 2, which are used to create a unified query template, and then this template is used to create a HRBlob. The attributes of the potential queries include metadata and data columns used in the query, strongness of predicates used in the query, etc. When the system of the current invention takes a decision to arrange data, these templates are used. One HRBlob may be designed to serve a template or several templates, and not just a single query as commonly happens in prior art systems. This approach has a serious impact on data arrangement performance and on queries performance, since this approach helps much more queries to be performed better using less data arrangement objects.

Although embodiments of the invention have been described by way of illustration, it will be understood that the invention may be carried out with many variations, modifications, and adaptations, without exceeding the scope of the claims.

The invention claimed is:

1. A method comprising:
generating, by a computing system comprising computer hardware and independent of query processing, a set of one or more HRBlobs organized according to a hierarchy, wherein an HRBlob comprises a collection of arranged data stored as a single entity that is constructed from a data store or from another HRBlob, and is configured to provide an answer to one or more specific query templates comprising a requested dimension and a requested measure;
determining one or more respective properties associated with the one or more HRBlobs, the one or more respective properties comprising at least one of a measure, dimension, or level of arrangement;
receiving one or more queries from a user;
determining, by analyzing characteristics of the one or more queries and the one or more respective properties associated with the one or more HRBlobs, whether to service a given query of the one or more queries with the set of one or more HRBlobs or the data store;
in response to determining to service the given query with the set of one or more HRBlobs,
generating a response to the given query based on data from the set of one or more HRBlobs;
in response to determining to service the given query with data in the data store,
generating a response to the given query based on data from the data store; and
continuously updating the set of one or more HRBlobs based on updates to the data store for future query processing.

2. The method of claim 1, wherein the method is performed by a complementary system, which is added onto an existing data store system using an existing interface.

3. The method of claim 1, wherein the method is performed by an integrated system, which is integrated into a data store system.

4. The method of claim 1, wherein the method begins performance without any prior knowledge of the data store contents and any existing summary tables.

5. The method of claim 1, wherein each HRBlob comprises any subset of data store data records from the data store, with any subset of measures from the data store, and any subset and any combination of metadata dimensions from the data store, arranged in any order and in any level.

6. The method of claim 1, wherein each HRBlob comprises a dimension and measure that are recalculated based on changes to the data store.

7. The method of claim 1, further comprising automatically recognizing and adapting changes in the data store's content and in the data store's properties by updating the set of one or more HRBlobs.

8. The method of claim 7, wherein the changes are adapted online either prior to a query, or while processing a query, or after the query was executed.

9. The method of claim 7, wherein the changes are adapted offline.

10. The method of claim 1, further comprising creating a new HRBlob to answer the given query if, in response to determining to service the given query with the set of one or more HRBlobs, there is no existing HRBlob to answer the query.

11. The method of claim 1, further comprising routing the query to the data store to be processed if, in response to determining to service the given query with the set of one or more HRBlobs, there is no existing HRBlob to answer the query.

12. The method of claim 1, wherein queries are processed online.

13. The method of claim 1, wherein queries are processed offline.

14. The method of claim 1, wherein continuously updating the set of one or more HRBlobs further comprises continuously updating the set of one or more HRBlobs in the absence of query proccessing.

15. A computing system comprising:
a non-transitory computer readable medium storing machine-executable instructions configured for execution by the computing system in order to cause the computing system to:
generate, independent of query processing, a set of one or more collections of arranged data, wherein a collection of arranged data is stored as a single entity that is constructed from a data store, and is configured to provide an answer to one or more specific query templates comprising a requested dimension and a requested measure;
determine one or more respective properties associated with the one or more collections of arranged data, the one or more respective properties comprising at least one of a measure, dimension, or level of arrangement;
receive one or more queries from a user;
determine, by analyzing characteristics of the one or more queries and the one or more respective properties associated with the one or more collections of arranged data, whether to service a given query of the one or more queries with the set of one or more collections of arranged data or the data store,
in response to determining to service the given query with the set of one or more collections of arranged data,
generate a response to the given query based on data from the set of one or more collections of arranged data;
in response to determining to service the given query with data in the data store,
generate a response to the given query based on data from the data store; and
continuously update the set of one or more collections of arranged data based on updates to the data store.

16. The computing system of claim 15, wherein each collection of arranged data comprises any subset of data store data records from the data store, with any subset of measures from the data store, and any subset and any combination of metadata dimensions from the data store, arranged in any order and in any level.

17. The computing system of claim 15, wherein the instructions are further configured to cause the computing system to automatically recognize and adapt changes in the data store's content and in the data store's properties by updating the set of one or more collections of arranged data.

18. The computing system of claim 15, wherein each collection of arranged data comprises a dimension and measure that are recalculated based on changes to the data store.

19. The computing system of claim 15, wherein continuously updating the set of one or more collections of arranged data further comprises continuously updating the set of one or more collections of arranged data in the absence of query processing.

20. A non-transitory computer-readable medium encoded with instructions thereon, wherein the instructions are readable by a computing device in order to cause the computing device to perform operations comprising:
generating a set of one or more collections of arranged data independent of query processing, wherein a collection of arranged data is stored as a single entity that is constructed from a data store, and is configured to provide an answer to one or more specific query templates comprising a requested dimension and a requested measure;
continuously updating the set of one or more collections of arranged data based on updates to the data store;
determining one or more respective properties associated with the one or more collections of arranged data, the one or more respective properties comprising at least one of a measure, dimension, or level of arrangement;
receiving one or more queries from a user;
determining, by analyzing characteristics of the one or more queries and the one or more respective properties associated with the one or more collections of arranged data, whether to service a given query of the one or more queries with the set of one or more collections of arranged data or the data store; and
in response to determining to service the given query with the set of one or more collections of arranged data,
generating a response to the given query based on data from the set of one or more collections of arranged data.

21. The computer-readable medium of claim 20, wherein each collection of arranged data comprises any subset of data store data records from the data store, with any subset of measures from the data store, and any subset and any combination of metadata dimensions from the data store, arranged in any order and in any level.

22. The computer-readable medium of claim 20, wherein the operations further comprise automatically recognizing and adapting changes in the data store's content and in the data store's properties by updating the set of one or more collections of arranged data.

23. The computer-readable medium of claim 20, wherein each collection of arranged data comprises a dimension and measure that are recalculated based on changes to the data store.

24. The computer-readable medium of claim 20, wherein continuously updating the set of one or more collections of arranged data further comprises continuously updating the set of one or more one or more collections of arranged data in the absence of query processing.

* * * * *

UNITED STATES PATENT AND TRADEMARK OFFICE
CERTIFICATE OF CORRECTION

Page 1 of 2

PATENT NO. : 8,364,697 B2
APPLICATION NO. : 12/490981
DATED : January 29, 2013
INVENTOR(S) : Matias et al.

It is certified that error appears in the above-identified patent and that said Letters Patent is hereby corrected as shown below:

In the Drawings

In Fig. 6B, Sheet 7 of 9, for Tag "513", delete "for wards" and insert -- forwards --, therefor.

In the Specification

In Column 1, Line 36, delete "implement" and insert -- implement; --, therefor.

In Column 7, Line 66, delete "Flow; and" and insert -- Flow; --, therefor.

In Column 7, Line 67, delete "queries." and insert -- queries; --, therefor.

In Column 8, Line 2, delete "process" and insert -- process. --, therefor.

In Column 9, Lines 51-52, delete "Quantity[B1]=+Quantity[A2]," and insert -- Quantity[B1]=Quantity[A1] + Quantity[A2], --, therefor.

In Column 13, Line 24, delete "Control Module 106a;" and insert -- Control Module 105a; --, therefor.

In Column 13, Line 28, delete "HRBlobs Arrangement Engine 10e;" and insert -- HRBlobs Arrangement Engine 105e; --, therefor.

In Column 13, Line 31, delete "Control Module 106a" and insert -- Control Module 105a --, therefor.

In Column 13, Line 37, delete "Control Module 106a" and insert -- Control Module 105a --, therefor.

In Column 13, Line 43, delete "HRBlob Storage 10c," and insert -- HRBlob Storage 105c, --, therefor.
In Column 13, Line 47, delete "Execution Statistics Provider 10g," and insert -- Execution Statistics Signed and Sealed this
Third Day of June, 2014

Michelle K. Lee
*Deputy Director of the United States Patent and Trademark Office*

CERTIFICATE OF CORRECTION (continued)

Provider 105g, --, therefor.

In Column 13, Lines 52-53, delete "Control Module 106a," and insert -- Control Module 105a, --, therefor.

In Column 14, Line 12, delete "HRBlob Arrangement Engine 10e." and insert -- HRBlob Arrangement Engine 105e. --, therefor.

In Column 14, Line 13, delete "HRBlob Arrangement Engine 10e" and insert -- HRBlob Arrangement Engine 105e --, therefor.

In Column 14, Line 66, delete "HRBlobs Storage 10c" and insert -- HRBlobs Storage 105c --, therefor.

In Column 15, Line 3, delete "HRBIob" and insert -- HRBlob --, therefor.

In Column 15, Line 9, delete "HRBlob Storage 10c" and insert -- HRBlob Storage 105c --, therefor.

In Column 15, Line 11, delete "HRBIob" and insert -- HRBlob --, therefor.

In Column 15, Line 15, delete "HRBIob" and insert -- HRBlob --, therefor.

In the Claims

In Column 17, Line 10, in Claim 10, delete "query." and insert -- given query. --, therefor.

In Column 17, Line 12, in Claim 11, delete "query" and insert -- given query --, therefor.

In Column 17, Line 15, in Claim 11, delete "query." and insert -- given query. --, therefor.

In Column 17, Line 24, in Claim 14, delete "proccessing." and insert -- processing. --, therefor.

In Column 17, Line 48, in Claim 15, delete "store," and insert -- store; --, therefor.

In Column 18, Line 61, in Claim 24, delete "one or more one or more" and insert -- one or more --, therefor.